United States Patent Office 3,592,839
Patented July 13, 1971

3,592,839
ALIPHATIC KETO-CARBOXYLIC ACIDS
Ronald L. Broadhead, Addison, Ill., and Yedavalli Shamsunder Rao, Dundas, Ontario, Canada, assignors to The Richardson Company, Melrose Park, Ill.
No Drawing. Filed Dec. 1, 1967, Ser. No. 687,108
Int. Cl. C07c *61/22, 101/44, 149/40*
U.S. Cl. 260—470                    7 Claims

ABSTRACT OF THE DISCLOSURE

Aliphatic poly(keto-carboxylic) acid compositions characterized by polyphenyl moieties and useful as curing agents for resins, as plasticizers, and as reactants for polyesters. These compositions are illustrated by 4,4'-oxybis- (3-benzoylpropenoic acid).

BACKGROUND AND SUMMARY

This invention relates to a family of polybasic acidic compositions characterized by both aliphatic groups and the following moiety:

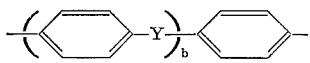

wherein $b$ is an integer of one or more, and Y represents an inorganic bridge. More particularly, the invention relates to those compositions which include both keto- and acidic-carbonyl groups in addition to the above moiety.

These compositions include polybasic acids and their derivative esters and acid chlorides which are characterized by the above moiety and the formula:

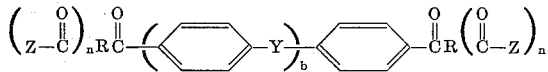

wherein $n$ is an integer of 1-2, $b$ is an integer of one or more, Y is a bridge of oxygen, sulfur or nitrogen, each R is an interconnecting aliphatic radical in which the only unsaturation is olefinic, and Z is —OH, —OR$_1$, or —Cl, where R$_1$ is a lower alkyl.

The compositions are useful as curing agents for resins such as epoxies, as plasticizers, and as reactants in the preparation of polymeric compositions such as polyesters. Unsaturated compositions such as:

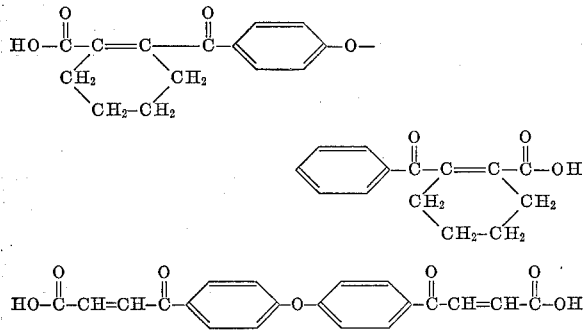

combine multiple polymeric building groups of both carboxyl and olefinic unsaturation. From compositions of this type, polyesters are prepared which have unusual characteristics for cross-linking or grafting. In addition, when Y represents a sulfur bridge, the acids when halogenated offer advantages of being useful in pesticidal preparations.

DESCRIPTION

Advantageously, these compositions are characterized by values of $b$ of 1-3 and by R being an interconnecting aliphatic radical between the keto and acidic carbonyl groups and having a chain length of not more than about 4 carbon atoms. Preferably, R is unsaturated and particularly so when Y is oxygen, since such compositions are useful as curing agents and as reactants for unsaturated polyester compositions. In addition, when R is unsaturated and preferably has conjugated unsaturation, the reactivity rates of the acids with alcohols are indicated to be significantly better than those for acids wherein R is saturated.

In addition to being straight chain, R may be alicyclic with two of the ring carbon atoms being in the interconnecting chain as in:

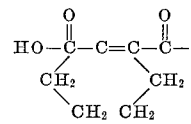

and may be substituted with groups such as alkyl, alkoxy, alkylene carboxyl, halogens and the like.

These acids are advantageously produced by reacting an aliphatic acid anhydride having the formula:

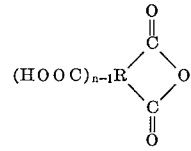

wherein $n$ and R are as previously defined, with a reactant having the formula:

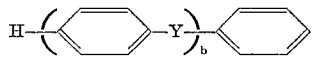

wherein $b$ and Y are as previously defined. The reactants are present in a respective mole ratio of at least about 2:1 and the reaction is carried out under conditions of a Friedel-Crafts reaction with at least about 4 moles and up to about 8 moles of AlCl$_3$ based on a difunctional reactant such as maleic anhydride.

With higher functional acidic reactants such as aconitic acid anhydride, the AlCl$_3$ is adjusted accordingly. In some instances it is advantageous to block the free carboxyl group prior to the reaction. In addition, the reactive conditions include the use of a chlorinated lower alkane solvent and advantageously include a solvent mixture of the chlorinated alkane and a nitrated aromatic. Illustrations of solvent components include methylene dichloride, tetrachloroethane, and the like; and nitrobenzene, nitrotoluene, and the like. The use of such a solvent mixture is advantageous to the utilization of the defined second reactant.

The process produces the keto-acids in yields above 50 percent. When unsaturated acidic reactants are utilized, the process produces yields commonly above about 80 percent, and in some instances around 90 percent. Advantageously, the process is carried out with an anhydride wherein $n$ equals one and a second reactant wherein Y is oxygen or sulfur. With the use of anhydrides, the reaction proceeds readily to produce the above-described acids. Usually, it is preferred to avoid the formation of polymers and therefore acid chlorides and other polyfunctional acidic reactants having a reactivity higher than the carboxyl group are not used. The ester and acid chloride derivatives are conveniently prepared by treating the polybasic acid with the usual esterifying agents such as alcohols or acid chloride forming agents such as sulfonyl chloride.

As indicated above in respect to the resultant products, R represents an aliphatic radical having a chain length of about 2-4 carbon atoms and preferably about 2-3 carbon atoms. When Y is oxygen, R preferably is olefinic with conjugated unsaturation because of the usefulness of the resultant polybasic acids in polyester reactions. When Y is sulfur, R is saturated or unsaturated. Illustrative chains for R are saturated and olefinically unsaturated radicals from ethane, propane and butane as present in anhydrides such as maleic, glutaric and adipic anhydrides. The chains may be branched as in methyl maleic anhydride (citraconic acid anhydride), methylene succinic anhydride (itaconic acid anhydride), and carboxy methyl maleic anhydride (aconitic acid anhydride) and may be part of an alicyclic structure as in dihydro- and tetrahydro phthalic anhydrides. The above structures may also be substituted with groups such as halogens, aryls, alkoxy and the like, and combinations of these groups. If substituted, R preferably contains chlorine and/or the lower alkyls.

The integer $n$ in the above formulas is equal to 1–3, advantageously 1–2, and preferably 1, because of the availability of the designated anhydrides and the functionality of the resultant keto-carboxylic acids particularly for the preparation of polyesters.

Illustrative of anhydrides useful in preparing the keto-carboxylic acids are maleic anhydride, 2-methyl maleic anhydride, 2-ethenyl maleic anhydride, glutaric anhydride, 2-ethenyl glutaric anhydride, 3-ethenyl glutaric anhydride, and alicyclic acid anhydrides such as 1,2 cyclobutane dicarboxylic acid anhydride, 1,2 cyclohexane dicarboxylic acid anhydride, 1,2 cyclohexene dicarboxylic acid anhydride, 1,2 cyclohexadiene dicarboxylic acid anhydride, 1,2,4 cyclohexane tricarboxylic acid anhydride, and the like.

The second reactant has the formula:

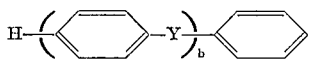

wherein $b$ is an integer of one or more and Y represents an inorganic bridge containing oxygen, sulfur or nitrogen. While the integer $b$ can be such to represent polymers having appreciable numbers of repeating units, usually and preferably it is in the order of 1–3. Usually, Y is —O—, —S—,

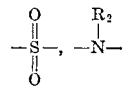

and

with $R_2$, $R_3$ and $R_4$ being alkyl and/or aryl. Advantageously, Y is based on oxygen or sulfur and preferably oxygen. The phenyl groups in the reactant may be unsubstituted or substituted. Suitable substituents include those defined for R and advantageously the halogens with chlorine being a preferred substituent.

As described above, the resultant polybasic acids are characterized by oxy and keto carbonyl groups in para positions. Illustrative acids include 4,4'-oxybis (3-benzoly-propenoic acid),
4,4'-oxybis (3-benzoyl-3-methyl-propenoic acid),
4,4'oxybis (3-benzoyl-2-methyl-propenoic acid),
4,4'-oxybis (3-chlorobenzoylpropenoic acid),
4,4'-oxybis (3-benzoyl-3-chloro-propenoic acid),
4,4'-oxybis (4-benzoyl butenoic acid),
4,4'-oxybis (2-benzoyl cyclohexenoic acid),
4,4'-oxybis (2-benzoyl cyclohexadienoic acid),
4,4'-thiabis (3-benzoyl-propanoic acid),
4,4'-thiabis (3-benzoylpropenoic acid),
4,4'-thiabis (3-chlorobenzoyl propanoic acid),
4,4'-thiabis (3-benzoyl butanoic acid),
4,4'-thiabis (2-benzoyl cyclohexanoic acid),
4,4'-thiabis (2-benzoyl cyclohexenoic acid),
4,4'-methoylamino bis (3-benzoyl propenoic acid),
4,4'-methylamino bis (2-benzoyl cyclohexanoic acid),
4,4'-methylamino bis (2-benzoyl cyclohexenoic acid), and similar acids derived from polyphenyl reactants wherein $b$ is 2–3. Acids such as 4,4'-oxybis (3-benzoyl propenoic acid),
4,4'-oxybis (2-benzoyl cyclohexenoic acid),
4,4'-oxybis (2-benzoyl cyclohexadienoic acid),
4,4'-thiabis (3-benzoyl propenoic acid), and
4,4'-thiabis (3-benzoyl propanoic acid)

are characteristic of preferred acids.

The following examples illustrate some of the embodiments of this invention. It is to be understood that these are for illustrative purposes only and do not purport to be wholly definitive as to conditions or scope.

EXAMPLE I

A polybasic acid was prepared from diphenyl oxide and maleic anhydride. The preparation was carried out in a 500 millimeter flask in which about 80 ml. of tetrachloroethane and 20 ml. of nitrobenzene were added. About 17 grams of diphenyl oxide (0.1 mole) and about 19.2 grams of maleic anhydride (0.2 mole) were added to the solvent mixture. Anhydrous aluminum chloride (66.6 grams) were added to the above solution over a period of time (approximately ½ hour) with care being taken to keep the temperature below about 50° C. After the evolution of hydrogen chloride was over, the reaction mixture was set aside for 2 hours and decomposed with 250 ml. of 15 percent hydrochloric acid (cooled).

The solvent mixture was removed by distillation. When the nitrobenezene was completely stripped off, the yellow product, 4,4'-oxybis (3-benzoyl propenoic acid) remained as a suspension. It was filtered, washed and dried. This product was quite pure and weighed about 35 grams as compared with the theoretical yield of 36.2 grams. The product had a melting point of 228° C.

The dibasic acid was analyzed for carbon and hydrogen and its molecular weight was determined by its neutral equivalent. The experimental and calculated carbon and hydrogen contents, respectively, were 65.45 percent compared to 65.57 percent and 3.92 percent compared to 3.8 percent. Its molecular weight, as determined by its neutral equivalent, was approximately 359 compared to a calculated value of 366.

EXAMPLE II

Another polybasic acid was prepared from tetrahydrophthalic anhydride with diphenyl oxide in a similar manner to the preparation of the product of Example I. The product [4,4' - oxybis (2 - benzoyl cyclohexenoic acid)] exhibited a melting point of 190° C. and a molecular weight of approximately 469 compared to a calculated value of 474.

EXAMPLE III

A polybasic acid was prepared from diphenyl sulfide and maleic anhydride. The preparation was carried out in a 500 ml. Erlenmeyer flask into which about 80 ml. of tetrachloroethane and 20 ml. of nitrobenzene were added. About 18.6 grams of diphenyl sulfide (0.1 mole) and 19.6 grams (0.2 mole) of maleic anhydride were then added to the solvent mixture. Anhydrous aluminum chloride (about 66.6 grams) was added to the above solution over a period of 30 minutes, with care being taken to maintain the temperature below about 50° C. After the evolution of HCl gas was over, the reaction mixture was set aside for about 2 hours and decomposed with 250 ml. of 15 percent dilute HCl (cooled). The solvent mixture was removed by distillation. When all the nitrobenzene was propenoic acid), remained as a finely divided suspension. It was filtered, washed and dried. This product, practically pure, melted at 232–33° C. The yield was about 37 grams of product. Molecular weight of the product was determined to be approximately 382 as compared to the calculated value of 379.9.

EXAMPLE IV

A polybasic acid was prepared from diphenyl sulfide and succinic anhydride using a similar process to that of Example III. The product, 4,4'-thiabis (3-benzoyl propanoic acid), exhibited a melting point of 179° C. and a molecular weight of approximately 388 compared to a calculated value of 386.

EXAMPLE V

The dibasic acid of Example IV was converted under conventional oxidizing conditions to 4,4'-sulfonylbis (3-benzoyl propanoic acid). The acid exhibited a melting point of 90° C. and a molecular weight of approximately 510 compared to a calculated value of 514.

While the invention has been described in conjunction with specific examples thereof, these are illustrative only. Accordingly, many alternatives, modifications, and variations will be apparent to those skilled in the art in the light of the foregoing description, and it is therefore intended to embrace all such alternatives, modifications, and variations as to fall within the spirit and broad scope of the appended claims.

We claim:

1. A composition of the formula:

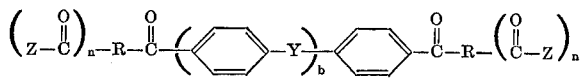

wherein Y is oxygen, sulfur or sulfonyl, R is a bivalent 6 carbon atom alicyclic radical with two of the ring carbon atoms in the interconnecting chain, Z is a member selected from the group consisting of OH, $OR_1$ and Cl, where $R_1$ is a lower alkyl and both $b$ and $n$ are integers of 1.

2. The composition of claim 1 wherein Z is $OR_1$.
3. The composition of claim 1 wherein Z is CL.
4. The composition of claim 1 wherein Y is oxygen.
5. The composition of claim 1 wherein Y is sulfur.
6. The composition of claim 1 wherein it is 4,4'-oxybis-(2-benzoyl cyclohexenoic acid).
7. The composition of claim 1 wherein it is 4,4'-oxybis-(2-benzoyl cyclohexadienoic acid).

References Cited

UNITED STATES PATENTS

| | | | |
|---|---|---|---|
| 3,455,993 | 7/1969 | Gildersleve | 260—473 |
| 3,116,323 | 12/1965 | Cavallini | 260—471 |
| 2,588,802 | 3/1952 | Burtner | 260—520 |

LEWIS GOTTS, Primary Examiner

E. J. GLEIMAN, Assistant Examiner

U.S. Cl. X.R.

260—31.2R, 31.2N, 31.8C, 31.8K, 31.8Z, 32.2, 471R, 473G, 515M, 516, 518R, 520, 544M, 515A